Feb. 3, 1953 S. KOFFLER 2,627,430
AIR DUCT
Filed Feb. 15, 1950
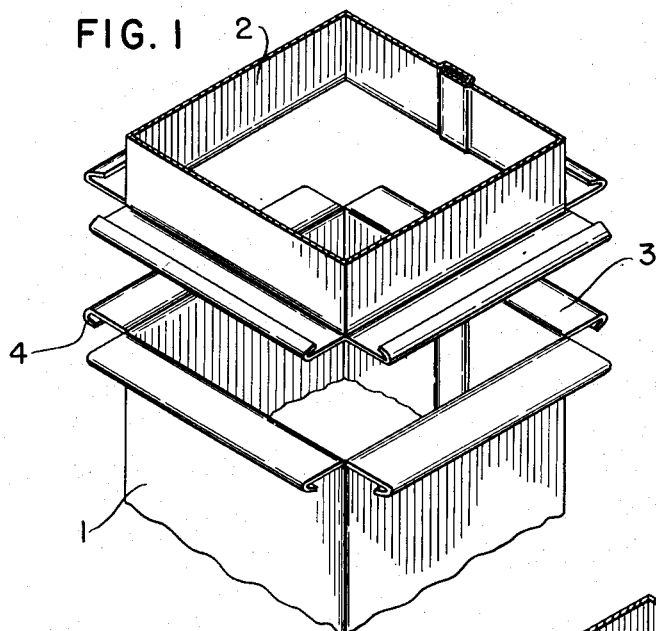
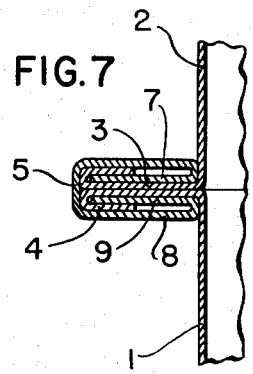
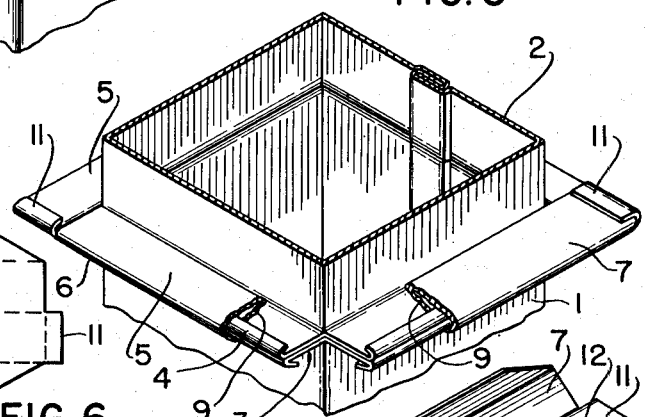
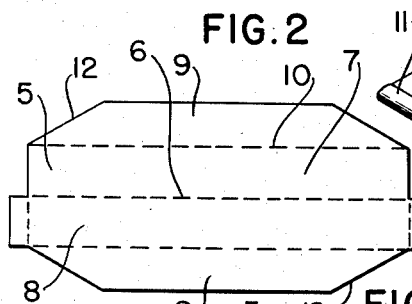
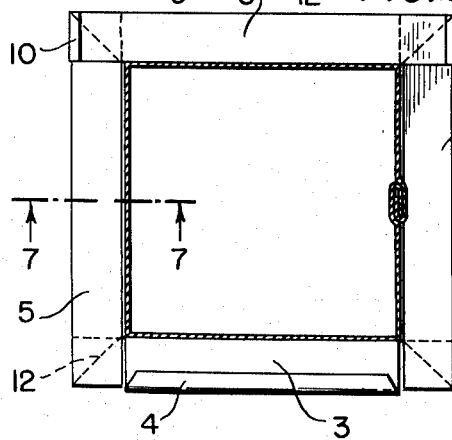
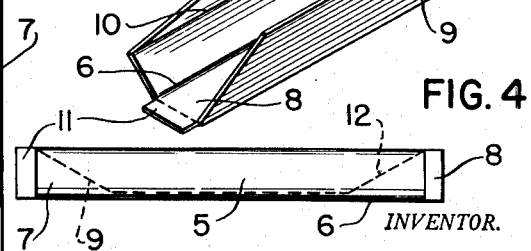
INVENTOR.
Samuel Koffler
BY William F. Nickel
ATTORNEY Patented Feb. 3, 1953

2,627,430

UNITED STATES PATENT OFFICE 2,627,430

AIR DUCT

Samuel Koffler, Brooklyn, N. Y.

Application February 15, 1950, Serial No. 144,338

1 Claim. (Cl. 285—201)

My invention is an improvement in couplings or joints, particularly joints or couplings for flues and conduits such as are used in conditioning air for the interior of buildings.

An important object of this invention is to provide means which will unite the ends of sections of a flue or conduit in a manner that effectually obviates leaks and which will permit the joint to be quickly and easily made, even in places where there is little free space for the hands of the workman performing the task.

Another object is to provide simple, inexpensive and practical means for joining the adjacent ends of the sections of a flue or conduit, with a minimum of labor cost.

The nature and advantages of the invention are fully set forth hereinafter, and the novel features are pointed out in the claim. On the drawings a preferred embodiment of the invention is illustrated but alterations in details may be incorporated in the structure shown without departing from the main design in which the improvement is contained.

On the drawings:

Figure 1 is a perspective view of the adjacent ends of two flue sections to be joined together.

Figure 2 is a plan view of a blank which is formed into a clamping or locking strip or member.

Figure 3 is a perspective view of such a strip or member in process of formation.

Figure 4 is a plane view of the member completed.

Figure 5 is a perspective view similar to Figure 1 showing how the locking strips or members are attached to the ends of the sections of a flue or conduit.

Figure 6 is a top plan of the coupling or joint, partly finished; and

Figure 7 is a sectional view showing how the ends of the sections of a flue or conduit and the locking members engage one another.

The invention is especially adapted for joining flues or conduits having flat sides, and being square or otherwise polygonal in cross section, but is not limited to such a construction. The numerals 1 and 2 indicated two such sections, each having outward bent flanges 3 at the ends, each of said flanges extending across one side or face of the sections. Each flange has its outer edge doubled towards the outside of the flue, forming a retaining rim 4. When the sections are assembled with their ends jutaposed, each flange on one makes contact and coincides with a flange on the other.

The locking strips or clamping members 5 are produced from pieces that are formed by doubling them along a longitudinal center line 6. Each half comprises a portion 7 and a portion 8, bent longitudinally so as to have inturned rims 9 along their opposite edges, said rims being preferably of the same width as the parts 7 and 8. The lines of bend are indicated at 10. The ends 11 of the portions 8 project beyond the ends of the portions 7. The members 5 are put into place by slipping them lengthwise upon and over the matching flanges 3 of the sections 1 and 2, the portions 7 and 8 being close enough to each other to enable the parts or rims 9 to pass within the narrower overturned rims 4 of the flanges 3 and interlock therewith, as fully illustrated in Figures 6 and 7. The strips are then compressed by a suitable tool, preferably one having rollers that can be forced against both faces 7 and 8 of the strips 5, to cause the strips to engage the flanges 3 and rims 4 tightly as indicated on Figure 7.

The operation is terminated by bending the projecting end 11 of some of the strips over into locking position. The members 5 are longer than the flanges 3, so that each strip will not only envelop a pair of matching flanges 3, but also extend beyond the extremities thereof as far as the outer edges of the two adjacent flanges 3. The ends of the strips 5 will thus overlap. Only two strips 5 need have the projections 11, but the extremities of these will envelop the extremities of the other two, and the projections 11 will be bent over and pressed into firm and close engagement with both the extremities of the other two. The strips will thus be secured all round the flue, filling the outside corner spaces between the flanges 3 up to the edge along the side of the flue, and escape of air is effectively prevented.

Figure 6 presents the relative positions of the flanges and strips 5 and indicates how the latter can be affixed. Three strips are in place, and the fourth is attached like the other three by endwise movement; the remaining member, for example, in the position of Figure 4 with the portion 7 uppermost and the portion 8 under it being slipped over the end of the member 5 at the right in Figure 6, along the matching flanges 3, still uncovered, and finally over the adjacent end of the member 5 at the left. The two projections 11 are then bent over and compressed upon the portion 7, gripping the two adjacent ends of said members 5, in the same way as the other ends of said two members at the top of Figure 6 are gripped. The rims 9 on each strip terminate short of the rims on the adjacent strips, because the rims have bevelled ends 12 which clear one another when the members 5 are flattened and made fast. All parts are pressed together fully into one solid bead around the flue as indicated in Figure 7.

The arrangement of the projections 11 can of course be varied. Each strip 5 could have a single projection, so that there would be such a bent over projection at each and every corner of the flue, and the effect would be the same.

The utility of the improvement is very apparent. The locking members and flue sections can be made of metal or other suitable material and given the required shape readily and at moderate expense. The sections 1 and 2 can be united by merely slipping them over the matching flanges and securing them as above set forth. This can be done where space is limited and the task can be easily and quickly performed.

Having described my invention, what I believe to be new is:

A joint for two sections of a conduit, said sections having flanges perpendicular to the sections at their ends, each flange on one section abutting and making full contact with a flange on the other section when the sections are in juxtaposition, and a locking strip comprising longitudinal portions bent over towards each other for each pair of abutting flanges, said strips having inturned rims along the opposite edges of said portions, and said flanges having turned-over rims on their outer edges to interlock with the rims on said strips, the latter being longer than said flanges, the ends of both portions of some of said strips being inserted between portions at the ends of other strips and being overlapped by said last-named portions, said last-named strips each having a projection on one of said last-named portions at each overlapping end, said projections being bent over to grip the other portions of the last-named strips and the ends of both portions of a strip between the last-named strips, the inturned rims on each strip terminating short of the rims on the adjacent strips to avoid overlapping of the rims on said strips.

SAMUEL KOFFLER.

REFERENCES CITED

The following references are of record in the file of this patent:

UNITED STATES PATENTS

| Number | Name | Date |
|---|---|---|
| 381,756 | Caldwell | Apr. 24, 1888 |
| 641,580 | Cummins | Jan. 16, 1900 |
| 726,004 | Stein et al. | Apr. 21, 1903 |
| 760,216 | Laws | May 17, 1904 |
| 1,484,491 | Gutermann | Feb. 19, 1924 |
| 2,126,014 | Holub | Aug. 9, 1938 |
| 2,332,641 | Jahant | Oct. 26, 1943 |